Dec. 19, 1967 — R. B. TRASK — 3,359,449

MULTIPLE SECTION GRAPHITE ELECTRODE

Filed Oct. 27, 1964

INVENTOR.
ROBERT B. TRASK
BY Robert J. Crawford
ATTORNEY

United States Patent Office 3,359,449
Patented Dec. 19, 1967

3,359,449
MULTIPLE SECTION GRAPHITE ELECTRODE
Robert B. Trask, Model City, N.Y., assignor to Air Reduction Company, Incorporated, New York, N.Y., a corporation of New York
Filed Oct. 27, 1964, Ser. No. 406,832
5 Claims. (Cl. 313—357)

ABSTRACT OF THE DISCLOSURE

To minimize the adverse effect of hoop stresses created in large diameter graphite furnace electrodes by the thermal variations to which they are subjected in service, such electrodes are made of a grade of graphite that has a low coefficient of thermal expansion. Electrode connecting nipples must be made of a more dense grade of graphite (with attendant higher coefficient of thermal expansion) to withstand the much greater mechanical loads to which they are subjected. By modifying the nipple graphite with boron the strength can be maintained and the coefficient of thermal expansion matched to that of the electrode to prevent failure of the assembly at the joint as a result of unequal expansion and contraction of the electrodes and connecting nipple in service in the furnace.

---

The present invention relates to graphite electrodes of extended length, the electrodes being constructed by combining a plurality of sections of graphite stock into a single unit. More particularly, the invention relates to a multiple section graphite electrode, each section of which has internally threaded end portions, the sections being joined together by externally threaded boron modified graphite connectors, hereinafter referred to as nipples, which mate with the internally threaded end portions of the electrode sections.

In order that my invention be clearly understood, it is necessary that certain words or phrases be defined. By "hoop stresses" I mean those stresses which are created in the outermost portions of the electrodes by expansion and contraction of the electrodes due to heating and cooling thereof. By "graphite electrode stock" I mean those sections of graphite stock which are used to form extended length multiple section graphite electrodes. By "graphite nipple stock" I mean those sections of graphite stock from which nipples are formed, the nipple being for the purpose of interconnecting the electrode stock sections. When I say that the coefficient of thermal expansion of the nipple "matches" the coefficient of thermal expansion of the electrode, I mean that the coefficient of thermal expansion of the nipple and electrode are within a permissible range of each other, as will be defined hereinafter.

In the manufacture of graphite electrodes it has been determined that the flexural strength and the coefficient of thermal expansion of the electrodes vary directly. Therefore, as the coefficient of thermal expansion of the electrode decreases, the strength of the electrode also decreases. Since the large diameter electrode stock is subjected to hoop stresses during heating and cooling, it has been generally accepted that low coefficient of thermal expansion electrode stock is required. As the electrode stock requires a low coefficient of thermal expansion, the electrode likewise is of relatively low strength.

It is common practice to make a graphite electrode of extended length by connecting together a plurality of pieces of electrode stock which have internally threaded end portions by the use of threaded graphite nipples which mate with the internally threaded electrode stock end portions. Since the low coefficient of thermal expansion of the electrode stock is of low strength, this stock is not suitable for use in the smaller diameter graphite nipples. Consequently, the graphite stock used for the nipple construction must be more dense and stronger than the stock used for the graphite electrode itself. The high density nipple stock which has the increased strength necessarily results in a higher coefficient of thermal expansion for the nipples. Therefore, when electrodes which are connected by these prior art high strength nipples are heated during their use, the nipple expands in the transverse direction at a far greater rate than the electrode and results in the cracking of the electrode at the electrode-nipple joints. When the electrodes crack, they become subject to oxidation and rapid structural deterioration. Since the electrodes are of great weight, the joints break and the electrodes fall to the bottom of the furnace. The furnace must then be closed down so that the electrode may be removed. Obviously, such procedure is time-consuming and results in great financial loss in the operation of the furnace. It is therefore of extreme importance that the electrode joints be so constructed that failure does not occur during the use of the electrode.

The present invention overcomes the foregoing difficulties by modifying the prior art graphite nipple in such a manner that the high strength is maintained and at the same time reducing the coefficient of thermal expansion to match the coefficient of thermal expansion of the electrode stock. It has been determined that if the nipple stock is boronized with 0.5% to 10% by weight, depending upon the particular nipple stock composition, the coefficient of thermal expansion can be controlled to the extent that cracking of the electrode at the joints does not occur.

It is therefore an object of the invention to provide an improved assembly of graphite electrode sections by an interconnecting nipple.

It is another object of the present invention to provide an improved graphite nipple for graphite electrodes. It is a further object of the present invention to provide a nipple for multiple section graphite electrodes which is modified by the use of boron. It is an additional object of the invention to provide a graphite nipple for carbon graphite multiple section electrodes which has a coefficient of thermal expansion substantially the same as or less than that of the electrode sections. Another object of the present invention is to provide a multiple section carbon graphite electrode having high flexural strength properties. It is a further object of the invention to provide a multiple section graphite electrode, the sections of which are joined by graphite nipples which have a coefficient of thermal expansion which is the same as or less than that of the electrode sections.

The exact nature of this invention, as well as other objects and advantages thereof, will be readily apparent from consideration of the following specification relating to the annexed drawings in which.

Figure 1:
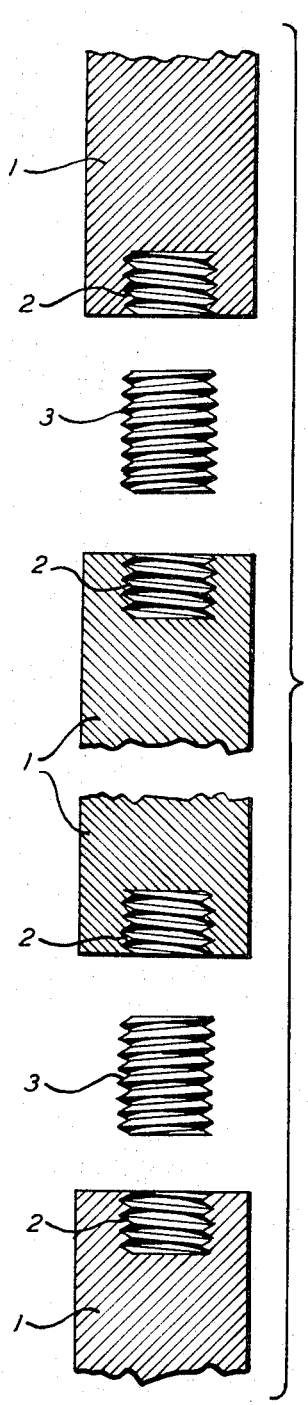
FIGURE 1 is an exploded view partly in section of a multiple section graphite electrode.
Figure 2:
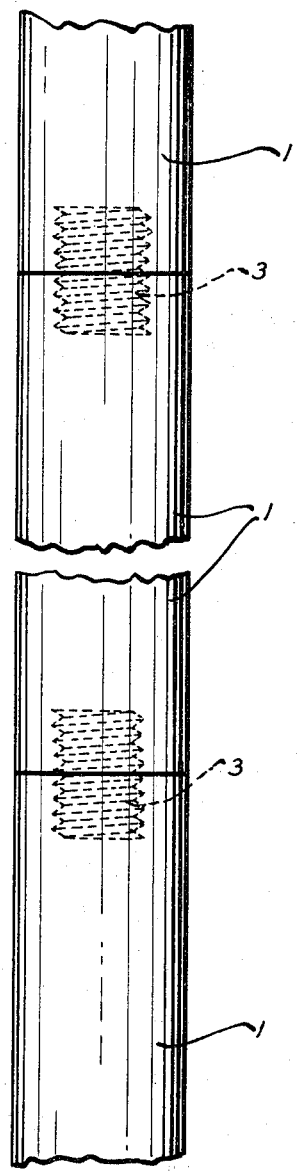
FIGURE 2 is a view of an assembled multiple section graphite electrode, the sections of which are mechanically connected by a boron modified graphite nipple.

Referring now to FIGURE 1 of the drawings, the carbon electrode sections 1 are internally threaded as shown t 2 to receive externally threaded boron modified carbon nipples or connectors 3. FIGURE 2 shows the electrode sections threaded on to the nipples to provide a continuous extended electrode.

The graphite electrode stock used is of the type commonly sold on the commercial market. As previously indicated, graphite electrode stock is subjected to hoop stresses during heating and cooling, and therefore must necessarily have a low coefficient of thermal expansion. Since the coefficient of thermal expansion is directly related to the flexural strength of the material itself, the electrode stock is not suitable for use as nipple connectors. Connecting nipples are thus generally manufactured of a more dense type carbon material than is used for the electrode stock. For example, the relatively high strength-high coefficient of thermal expansion nipple stock normally contains no particles which would be retained on a 10 mesh screen. The relatively low strength-low coefficient of thermal expansion electrode stock normally contains a significant amount of particles which would be retained on a 10 mesh screen.

Since the dense graphite nipple stock normally has a much higher coefficient of thermal expansion than does the graphite electrode stock, it is apparent that upon heating of the multiple section electrode the nipples expand much more rapidly than does the electrode itself and cracking of the electrode is a common occurrence. To obviate this difficulty it has been discovered that a nipple stock which is modified with various percentages of boron has a substantially lower coefficient of thermal expansion than does the unmodified nipple stock and at the same time maintains its high flexural strength.

To show the effect of boron on nipple stocks having different coefficients of thermal expansion before modification, a number of formulations were prepared. It may be noted that boron carbide, hexaboron silicide and calcium boride were used as the source material for the boron additive. Since boron forms approximately 78%, 70% and 50% respectively of these source materials, it can be seen from Table I that the amount of boron additive in these sample formulations ranges from approximately 0.5% to 8% by weight of the total electrode composition. These formulations in Table I are examples of the many types of materials that may be used in forming the nipple stock. The use of other filler materials, binders, boron source material, or extrusion aids, will provide the same general effect and are contemplated by this invention.

TABLE I.—FORMULATIONS OF TESTED NIPPLE STOCK

| | Function | Percent by Wt. | Material |
|---|---|---|---|
| 1 | Filler | 71.3 | Calcined petroleum coke flour. |
| | Binder | 26.4 | #30 medium coal-tar pitch. |
| | Boron source | 0.8 | Boron carbide. |
| | Extrusion aid | 1.5 | Ebony E oil. |
| 2 | Filler | 68.1 | Calcined petroleum coke flour. |
| | Binder | 25.2 | #30 medium coal-tar pitch. |
| | Boron source | 5.3 | Boron carbide. |
| | Extrusion aid | 1.4 | Ebony E oil. |
| 3 | Filler | 64.3 | Calcined petroleum coke flour. |
| | Binder | 24.4 | #30 medium coal-tar pitch. |
| | Boron source | 10.3 | Boron carbide. |
| | Extrusion aid | 1.0 | Ebony E oil. |
| 4 | Filler | 71.6 | Calcined petroleum coke flour. |
| | Binder | 26.2 | #30 medium coal-tar pitch. |
| | Boron source | 0.8 | Hexaboron silicide. |
| | Extrusion aid | 1.4 | Ebony E oil. |
| 5 | Filler | 65.5 | Calcined petroleum coke flour. |
| | Binder | 26.9 | #30 medium coal-tar pitch. |
| | Boron source | 5.9 | Calcium boride. |
| | Extrusion aid | 1.7 | Ebony E oil. |

Each of the foregoing five formulations was baked in the conventional manner to 700° C. The baked stock was graphitized in the standard commercial manner to about 2600° C. Items 1 through 5 of Table II correspond to Items 1 through 5 of Table I and, Item 6 of Table II relates to a formulation as used in Items 1 through 5 of Table I but without any boron.

TABLE II.—COEFFICIENT OF THERMAL EXPANSION ×10$^{-6}$/C.

| Formulation | Longitudinal | Transverse | Flexural Strength (p.s.i.) |
|---|---|---|---|
| 1 | 2.11 | 3.86 | 1,626 |
| 2 | 2.38 | 1.39 | 2,350 |
| 3 | 1.98 | 1.94 | 1,780 |
| 4 | 2.13 | 3.95 | 2,012 |
| 5 | 2.26 | 2.56 | 2,320 |
| 6 | 2.00 | 4.18 | 1,684 |

As can be seen from the foregoing, the addition of boron to the nipple electrode stock markedly reduces the coefficient of thermal expansion in varied amounts, depending upon the percentage of boron used in the graphite composition, but does not substantially change the flexural strength characteristics of the electrode stock. Therefore, by modifying the coefficient of thermal expansion of the nipple to the electrode, the nipple-electrode assemblies are equivalent to standard assemblies, but the resistance to cracking is greater because of the reduction of the coefficient of thermal expansion of the electrode stock. Upon heating, no stress is developed in the nipple-electrode joints because the nipple is expanding at substantially the same rate as the electrode, whereas in the standard electrode assemblies the nipple expands at a faster rate than the electrode and results in cracking at the joints. In the same manner, on cooling from elevated temperatures, the nipple electrode assembly does not fail since both the nipple and electrode contract substantially the same amount for a given change in temperature. It should be noted that it is not necessary that the coefficient of thermal expansion of the graphite be exactly the same as the coefficient of thermal expansion of the electrode stock. For example, the coefficient of thermal expansion of commercial electrode stock is in the general range of $3.0 \times 10^{-6}$/C. It has been found that if the coefficient of thermal expansion of the nipple is maintained between $1.5 \times 10^{-6}$/C. and $4.0 \times 10^{-6}$/C., the coefficient of thermal expansions are sufficiently "matched" to prevent cracking at the joints. By modifying the nipple stock material with boron, the coefficient of thermal expansion of the nipple can easily be maintained within these limits. For example, coefficient of thermal expansion of the nipple stock made from the formulations set forth in Items 1, 3, 4, and 5 are within an allowable range.

Obviously many modifications and variations of the present invention are possible in the light of the above teachings. It is therefore to be understood that within the scope of the appending claims the invention may be practiced otherwise than as specifically described.

I claim:

1. A threaded nipple for graphite electrode assemblies consisting of graphite modified with 0.5% to 8% by weight of boron dispersed throughout to impart to said nipple a coefficient of thermal expansion within the range of from $1.5 \times 10^{-6}$/° C. to $4.0 \times 10^{-6}$/° C.

2. An electrode assembly consisting of at least two sections of graphite electrode stock having a coefficient of thermal expansion of the order of $3.0 \times 10^{-6}$/° C. and having internally threaded end portions, the adjacent sections of which are connected by a mating externally threaded graphite nipple of greater density than the said electrode stock and having substantially greater flexural strength than the said electrode stock and containing 0.5% to 8% boron by weight to reduce the coefficient of thermal expansion of the nipple to a value within the range of from $1.5 \times 10^{-6}$/° C. to $4.0 \times 10^{-6}$/° C.

3. An electrode assembly comprising at least two sections of graphite electrode stock having internally threaded end portions, said graphite electrode stock containing a significant amount of particles which would be retained on a 10 mesh screen, an externally threaded graphite nipple adapted to meet with and connect the sections of said graphite electrode stock, said graphite nipple consisting of particles most of which would pass through a 10 mesh screen, said graphite nipple containing 0.5% to 8% by weight boron dispersed throughout.

4. A threaded graphite nipple for graphite electrode assemblies wherein said nipple consists of particles most of which would pass through a 10 mesh wire screen and contains 0.5% to 10% by weight of boron dispersed throughout.

5. An electrode assembly comprising at least two sections of graphite electrode stock, said electrode stock composition being of relatively low density, and a graphite nipple connecting said electrode stock sections, said graphite nipple having a high density relative to the density of said electrode stock, said graphite nipple containing a sufficient amount of boron to reduce the coefficient of thermal expansion of the nipple to substantially the same value as the coefficient of thermal expansion of the graphite electrode stock.

References Cited
UNITED STATES PATENTS

| | | | |
|---|---|---|---|
| 2,083,402 | 6/1937 | Rowe | 313—171 |
| 2,186,189 | 1/1940 | Bangratz | 313—171 |
| 2,929,954 | 3/1960 | Blatz | 313—357 |
| 3,016,343 | 1/1962 | Krenzke | 287—127 X |

JOHN W. HUCKERT, *Primary Examiner.*

A. J. JAMES, *Assistant Examiner.*